PROCESS FOR PRODUCING FINE PARTICLE SIZE ALUMINA HYDRATES

Allan C. Kelly, Paio Alto, and Leo R. Barsotti, Pleasanton, Calif., and Robert B. Emerson, Baton Rouge, La., assignors to Kaiser Aluminum & Chemical Corporation, Oakland, Calif.
No Drawing. Filed Dec. 4, 1969, Ser. No. 882,283
Int. Cl. C01f 7/14
U.S. Cl. 23—143    9 Claims

ABSTRACT OF THE DISCLOSURE

Fine partcile size alumina hydrates, consisting essentially of a mixture of nordstrandite and bayerite, are made. The mixture is obtained by subjecting a sodium aluminate solution of high alumina and sodium hydroxide concentration to dilution under controlled conditions. The precipitated alumina hydrates consist essentially of a mixture of nordstrandite bayerite which, due to the fine particle size distribution and high surface area, provide an excellent catalyst base upon calcination. Thermal treatment of the mixture at elevated temperatures results in an activated alumina of essentially eta structure.

BACKGROUND OF THE INVENTION

This invention relates to the preparation of alumina hydrates. More particularly, it concerns the preparation of alumina trihydrates composed essentially of nordstrandite bayerite trihydrates.

Nordstrandite, also known in the art as randomite or bayerite II, exhibits an X-ray diffraction line at 4.79 angstroms (CuKα radiation), and upon a thermal treatment at elevated temperature it is converted to an alumina having essentially an eta structure. Bayerite is characterized by a line at 4.73 angstrom units as determined by X-ray diffraction analysis (CuKα radiation) and is believed to provide an eta alumina when subjected to a thermal treatment at elevated temperatures. The nordstrandite-bayerite mixture is an excellent catalyst base precursor due to the fine particle size and the high surface area which is provided on thermal treatment at elevated temperatures.

Aluminas, when utilized for catalysts and catalyst bases, should possess relatively high specific surface area, high porosity and desirable mechanical properties, such as high crush resistance and high abrasion resistance, to maintain the structure for extended periods of use. It is therefore desirable to prepare aluminas which possess all of these charatceristics, yet the process of preparation should be economical and controllable.

Nordstrandite-bayerite aluminas have been known in the art and were used where high activity, including unusually high dehydrocyclization activity and low rates of activity decline were desired. Preparation of nordstrandite-bayerite compositions have been described in the prior art, for example in U.S. Pat. 2,838,444 to John W. Teter et al. which discloses an alumina hydrogel formed by precipitating a gelatinous hydrous alumina from a solution of a soluble aluminum salt, such as aluminum chloride, by means of ammonium hydroxide. The hydrous alumina is subjected to aging to form a mixture of alumina trihydrates consisting of nordstrandite, bayerite and gibbsite. This prior art process provides a mixture wherein the nordstranite-bayerite ratio is hard to control and, depending on the rate of precipitation of the gelatinous hydrous alumina, the aging temperature and the presence of impurities such as ammonium salts, the ratio of nordstrandite to bayerite varies considerably. Additionally the aging is a time consuming process and must be carried out under carefully controlled conditions.

In order to overcome some of the disadvantages of this prior art process, it was suggested in U.S. Pat. 2,973,329 to John H. Koch to accelerate the aging process of the alumina hydrogel by the addition of hydrazine to produce an alumina trihydrate wherein a predominating portion is nordstrandite. While this process reduced the time required for the aging of the alumina hydrogel, the time period involved still amounted to 4–15 days under controlled temperature conditions. The long aging period, coupled with the addition of a relatively expensive agent such as hydrazine and with the large number of operative steps involved, renders the process uneconomical and additionally results in a varying norstrandite concentration from batch to batch.

It has now been found that these disadvantages can be eliminated by utilizing the process of the present invention wherein a nordstrandite-bayerite mixture is produce in controllable ratios of hydrous alumina species and within a much shorter time than required by prior art processes.

SUMMARY OF THE INVENTION

An alumina hydrate composition, consisting essentially of nordstrandite and bayerite hydrates, is prepared by first providing a sodium aluminate solution having a temperature above 80° C. and having an alumina ($Al_2O_3$) to caustic (calculated as $Na_2CO_3$) weight ratio of from about 0.8 to about 0.97 and a caustic concentration in excess of 400 grams per liter, but not exceeding 900 grams per liter. The aluminate solution is then admixed with water so as to reduce the caustic concentration to not more than 200 grams per liter and not less than 40 grams per liter, while the temperature during admixing is maintained between about 25 and 80° C. The rate of dilution and temperature control during the admixing provides an alumina hydrate composition consisting essentially of nordstrandite-bayerite.

DETAILED DESCRIPTION OF THE INVENTION

This invention relates to the preparation of alumina hydrates and specifically it concerns the preparation of alumina trihydrate compositions consisting essentially of nordstrandite-bayerite alumina trihydrates.

According to the process of the invention, a sodium aluminate solution is utilized, which is highly concentrated with regard to the alumina and caustic components. It is usual to partially express the alumina and caustic concentration in sodium aluminate solutions as a ratio and the generally employed designation for this ratio is the term $A/C$, wherein A equals the $Al_2O_3$ concentration in grams per liter, while C equals the sum of free sodium hydroxide and that combined with alumina and is expressed as sodium carbonate grams per liter. In the present process, sodium aluminate liquors are employed where the $A/C$ value is between about 0.8 and about 0.97, preferably within 0.84 and 0.95.

There are many ways to obtain a sodium aluminate solution in which the $A/C$ value is between 0.8 and 0.97. For example, it is possible to utilize a sodium aluminate liquor, such as produced by the Bayer process. In the Bayer process, bauxite is digested with caustic, followed by filtration of the insoluble residues. The filtrate, which is often called "pregnant liquor," usually has an $A/C$ value of from 0.5 to about 0.68. In order to obtain the desired $A/C$ ratio of 0.8 to about 0.97, this pregnant liquor can be evaporated and/or adjusted by the addition of alumina and caustic. It is possible to utilize the "spent liquor" from the Bayer process, that is, the liquor resulting from the precipitation step of the Bayer Process and while its caustic concentration is fairly high, the alumina content is considerably reduced due to the removal of alumina by precipitation. This spent liquor can be treated in the same manner as described above for the pregnant liquor to obtain the 0.8 to about 0.97 $A/C$ value. Additionally, the sodium aluminate solution utilized in the process can be prepared from any water soluble aluminum salt, which when reacted with sodium hydroxide or sodium carbonate is capable of producing the desired sodium aluminate solution. For example, the aluminum salt can be $Al_2(SO_4)_3$, $AlCl_3$ or others, and the salt is reacted with caustic to form the sodium aluminate. In this method of preparation, however, care must be exercised to insure that by-product ions which may contaminate the surface of the precipitated alumina hydrates are removed prior to thermal treatment.

Regardless of which method is employed for the preparation of the sodium aluminate solution, in every instance the sodium aluminate solution should have an $A/C$ value of from 0.8 to about 0.97 and a caustic concentration of 400 to 900 grams per liter, expressed as $Na_2CO_3$ in order to achieve the production of the desired nordstrandite-bayerite hydrate.

The sodium aluminate solution is then heated above 80° C., preferably above 100° C. If the sodium aluminate solution is prepared by digestion of the alumina hydrate under pressure, for example at 180° C., the hot sodium aluminate solution can be directly utilized after flashing to cool below about 120° C. The hot sodium aluminate solution is then diluted with water. The dilution of the sodium aluminate solution can be accomplished by either pouring the solution into water or by the addition of water to the solution. In either way, it is recommended that an average cooling rate at least about 0.5° C./minute, be employed, preferably a rate between about 0.5 and 4° C./minute. Higher cooling rates can also be utilized, if desired.

In order to obtain an alumina hydrate composition consisting essentially of nordstrandite and bayerite, the caustic concentration after dilution with water should be between about 200 grams per liter and about 40 grams per liter calculated as $Na_2CO_3$. It has been found that at higher final caustic concentrations, that is between about 95 g./l. and 200 g./l., the nordstrandite species predominates, while at lower caustic concentrations, the bayerite species will predominate in the alumina trihydrate mixture. When the concentration of the caustic is decreased below about 40 grams/liter nordstrandite will only be present in traces in the predominantly bayerite hydrate.

As mentioned above, at higher final caustic concentrations, the alumina trihydrate composition will contain a major amount of nordstrandite. For example, when a sodium aluminate solution having an $A/C$ value of 0.9 and a caustic concentration of 450 g./l. was cooled from 110° C. to 45° C. at an average rate of about 2.1° per minute by admixing with water in an amount which reduced the caustic concentration to 115.4 g./l., precipitation of alumina hydrate resulted in a final $A/C$ value of 0.56 and the nordstrandite content of the resulting alumina hydrate was about 90%, balance essentially bayerite. In contrast, when the same sodium aluminate solution was diluted to a final caustic concentration of 51.6 grams per liter within 30 minutes while cooling from 110° C. to 45° C., the produced alumina hydrate contained over 64% bayerite, balance nordstrandite and a small amount of gibbsite.

Precipitation of the alumina trihydrate begins, once the temperature of the sodium aluminate solution is reduced to below about 80° C. The precipitation may be spontaneous, i.e., autoprecipitation, due to the supersaturation of the solution at temperatures below about 80° C., or can be induced and accelerated by the addition of suitable seed, for example nordstrandite hydrate. The sodium aluminate solution is, for best results, cooled to below 80° C., preferably below about 60° C. Following completion of the cooling and dilution step, it is advantageous to maintain the sodium aluminate solution at temperatures between about 35° and 55° C. The holding period for the sodium aluminate solution within this temperature range can be advantageously chosen between 30 minutes and 24 hours. Longer holding periods are not recommended, as aging of the precipitated alumina may take place resulting in change in particle size and particle size distribution. Additionally, at longer holding times the agglomeration of the particles can also take place, which will also change the particle size and the particle size distribution.

The particle size of the produced alumina hydrates is generally below 5 microns, usually below 1 micron. This fine particle size is particularly desirable when the alumina hydrate consisting essentially of nordstrandite and bayerite is calcined to produce a catalyst base. The nordstrandite-bayerite mixture produced by the process is also characterized by its rapid dissolution rate in comparison to gibbsite of corresponding particle size which renders it even more desirable for many uses.

Following a holding period, the precipitated nordstrandite-bayerite is separated from the sodium aluminate mother liquor, preferably filtration. The mother liquor can be reused for the preparation of nordstrandite-bayerite mixtures after adjusting its alumina and caustic concentration to the required 0.8–0.97 $A/C$ value at 400–900 g./l. caustic concentration.

The precipitated alumina hydrates are usually dried at temperatures in excess of 100° C., usually at about 102–110° C. If desired, the surface of the precipitated hydrates may be washed with distilled or deionized water to remove any traces of adhered caustic, which may later interfere with the catalytic properties of the alumina. The dried alumina hydrates are then usually subjected to a thermal treatment, generally at temperatures between 350° C. and 750° C., or more, to convert the nordstrandite to an essentially eta structure. Any bayerite present in the mixture will convert upon this thermal treatment to eta alumina.

The thermally treated aluminas will possess a surface area in excess of 300 m.$^2$/g., usually between 300 and 400 m.$^2$/g. The pore volume of the thermally treated alumina produced by the present process is very large and, of its total pore volume, about 0.1 to 0.5 cubic centimeter per gram will consist of pores greater than 100 angstrom units in size, as determined by the BET nitrogen adsorption analysis. These properties render the calcined alumina eminently suitable for catalyst base and catalyst uses.

The following examples will serve to illustrate the invention, but they are not to be considered limiting.

EXAMPLE I

A sodium aluminate solution was prepared from $Al(OH)_3$ obtained from the Bayer process as Bayer hydrate. 775.1 gram $Al(OH)_3$ was dissolved in 1 liter of NaOH (45% by weight) to provide an $A/C$ value of 0.85, and a caustic concentration of 596.25 grams per liter expressed as $Na_2CO_3$. The solution was heated to 120° C. under agitation and then diluted with water (1 volume of sodium aluminate solution to 3 volumes of water) to obtain a final caustic concentration of about 150 grams per liter expressed as $Na_2CO_3$. The water temperature was 20° C. and it was added at a rate to obtain a temperature decrease of 2.5° C. per minute until the desired temperature of 45° C. was obtained. As the temperature of the sodium aluminate solution decreased below 80° C., precipitation of alumina hydrates was observed. The precipitation was spontaneous and the precipitated alumina had an average particle size below 1 micron. The diluted solution was maintained at 45° C. for 3 hours, followed by filtration of the precipitated alumina hydrate.

1 gram of the produced alumina trihydrate was placed into an Erlenmeyer flask, wetted with 10 ml. $H_2O$ and treated with 5 ml. concentrated $H_2SO_4$ and the temperature was raised to the boiling point. The alumina trihydrate dissolved completely in less than 10 seconds, indicating an extremely rapid dissolution rate.

A portion of the produced alumina trihydrate was dried at 105° C. for 1 hour and then subjected to X-ray diffraction analysis (CuKα radiation). The analysis indicated that over 90% of the produced alumina was nordstrandite (peak at 4.785 angstroms) and the balance bayerite (peak at 4.72 angstroms) with practically no gibbsite present.

Calcination of the alumina trihydrate at 450–600° C. provided an active alumina of essentially eta structure.

EXAMPLE II

A sodium aluminate solution was prepared from spent Bayer liquor containing about 150 grams per liter NaOH (equivalent to 200 grams $Na_2CO_3$ per liter) by addition of $Al(OH)_3$ and make-up caustic. The aluminate solution prepared had an $A/C$ value of 0.90 and a caustic concentration of 884 grams per liter expressed as $Na_2CO_3$. 1 liter of this solution was heated in excess of 110° C. and then poured into 7 liters of water (water temperature 20° C.) at a rate as to obtain the desired temperature of 40° C. within 30 minutes and a final caustic concentration of about 110 grams per liter $Na_2CO_3$. The diluted solution was agitated and the appearance of very fine particles was noted as soon as the temperature of the solution decreased below 80° C. When the temperature of the suspension decreaed to about 40–45° C., it was maintained at this temperature for 22 hours, followed by filtration of the precipitated alumina hydrates. A portion of the alumina hydrate was dried at 105° C. for 1 hour and then subjected to X-ray diffraction analysis (CuKα radiation). The analysis indicated the presence of nordstrandite in excess of 90% by weight, balance bayerite and a negligible amount of gibbsite. Calcination at 500–600° C. provided an alumina of essentially eta structure.

EXAMPLE III

A sodium aluminate solution was prepared from $Al(OH)_3$ obtained from the Bayer process. The sodium aluminate solution had an $A/C$ value of 0.95 and a caustic concentration of 662.5 grams per liter calculated as $Na_2CO_3$. The dilution was controlled to obtain a rate of cooling of about 1° C. per minute from about 110° C. to a desired temperature of about 35° C. The alumina trihydrate started to precipitate spontaneously as soon as the temperature decreased below about 80° C. Following the dilution, the sodium aluminate suspension was kept at 30–40° C. for 3 hours. The precipitated alumina hydrates were then filtered and dried at 110° C. for 1 hour. A sample of the dried hydrates was subjected to X-ray diffraction analysis which indicated the presence of about 76% bayerite, balance essentially nordstrandite with traces of boehmite and gibbsite.

EXAMPLE IV

A sodium aluminate solution was prepared by digesting under pressure at about 177° C. 520 grams of $Al(OH)_3$ in 1 liter of 24% NaOH solution, providing an $A/C$ value of 0.85 and a caustic concentration of 400 grams $Na_2CO_3$ per liter. A portion of this sodium aluminate solution was diluted to a final caustic concentration of 32 grams per liter, expressed as $Na_2CO_3$ and the temperature of this dilute solution was kept at about 35–40° C. Seed will precipitate immediately. This cooled solution was then admixed with the remainder of the hot, strong sodium aluminate solution in such proportions as to obtain a final caustic concentration for the resulting solution of about 198 grams per liter calculated as $Na_2CO_3$. The temperature of the admixture was then adjusted to and maintained at 35–40° C. for approximately 4 hours. By this method, the rate of precipitation was considerably increased and also the net yield of alumina hydrate was increased approximately twofold relative to yield obtained without seeding.

The alumina hydrates produced were subjected to X-ray diffraction analysis (CuKα radiation) after drying at 105° C. for 2 hours and the analysis indicated that the alumina trihydrate produced was essentially nordstrandite with less than 5% by weight of bayerite and traces of gibbsite.

Calcination at 550°–650° C. provided an active alumina of essentially eta structure.

What is claimed is:

1. A process for producing an alumina hydrate composition consisting essentially of a mixture of nordstrandite and bayerite which comprises
   (a) providing a sodium aluminate solution having an $Al_2O_3$ to caustic weight ratio of from about 0.80 to about 0.97 and wherein the caustic concentration of the sodium aluminate solution is initially of from about 400 grams per liter to about 900 grams per liter (calculated as $Na_2CO_3$ grams per liter),
   (b) maintaining the sodium aluminate solution at a temperature in excess of 80° C.,
   (c) admixing the sodium aluminate solution with an amount of water sufficient to reduce the caustic concentration to a final concentration of from about 40 grams per liter to about 200 grams per liter while simultaneously decreasing the temperature of the solution to within the range of about 20–80° C. at a rate of from about 0.5° to about 4° C. per minute,
   (d) precipitating and recovering the alumina hydrates consisting essentially of nordstrandite and bayerite.

2. Process according to claim 1, wherein the initial caustic concentration is reduced to a final concentration of from about 95 grams per liter to about 200 grams per litter and wherein the alumina hydrates recovered contain in excess of about 50% by weight norstrandite, balance essentially bayerite.

3. Process according to claim 1, wherein the initial caustic concentration is reduced to a final concentration of from about 40 grams per liter to about 95 grams per liter, and wherein the alumina hydrates recovered contain in excess of about 50% by weight bayerite, balance essentially nordstrandite.

4. Process according to claim 1, wherein the admixing is accomplished by adding water to the sodium aluminate solution.

5. Process according to claim 1, wherein the admixing is accomplished by adding the sodium aluminate solution to water.

6. Process according to claim 1, wherein the sodium aluminate solution is cooled to below about 80° C. at a rate of at least 0.5° C. per minute.

7. Process according to claim 1, wherein the sodium aluminate solution, after reaching the final caustic concentration is maintained at a temperature between 30 and 60° C.

8. Process according to claim 1, wherein the sodium aluminate solution is seeded to aid the precipitation.

9. Process according to claim 1, wherein the seed is produced in situ.

References Cited

UNITED STATES PATENTS

| | | | |
|---|---|---|---|
| 3,494,733 | 2/1970 | Keith et al. | 23—143 |
| 3,265,466 | 8/1966 | Mollard | 23—143 |
| 3,201,199 | 8/1965 | Lindsay et al. | 23—143 |
| 3,486,850 | 12/1969 | Day | 23—143 |

OTHER REFERENCES

"Chemical Abstracts," vol. 64, 1966, p. 7721d.

OSCAR R. VERTLZ, Primary Examiner

G. O. PETERS, Assistant Examiner